March 2, 1943.   L. W. HOSKINS   2,312,551
BIRD HOUSE
Filed Sept. 5, 1941

Inventor
Lynn W. Hoskins
By Cyrus Kehr & Swecker
his Attorneys

Patented Mar. 2, 1943

2,312,551

UNITED STATES PATENT OFFICE 2,312,551

BIRDHOUSE

Lynn W. Hoskins, Knoxville, Tenn.

Application September 5, 1941, Serial No. 409,730

4 Claims. (Cl. 119—23)

This invention relates to an improvement in bird houses of the character designed for enclosing and supporting the nests of wild birds.

Efforts have been made to encourage the propagation of different species of wild birds, particularly those which are beautiful in appearance, hardy and musical and especially valuable in the control of insect life which is so destructive to orchards, gardens, shrubbery, flowers and the like, through the erection of houses in which birds may build their nests and brood their young. Since natural nesting places are not usually available particularly in urban localities, if birds of these types are to be encouraged, facilities must be provided for the housing and support of the nests and the young birds and to protect them from pests and attacking animals, other species of birds and otherwise.

Attempts have been made heretofore to provide for the construction of bird houses, but these have not been altogether satisfactory either due to the mechanical construction thereof or to the difficulties of mechandising, shipping, or assembly, whereby they have not met with commercial success.

The object of this invention is to improve the construction of bird houses, to enable them to be manufactured in knocked-down condition for transportation in compact containers and which will permit of ready assembly with simple instructions, even by children, whereby such bird houses may be merchandised, as well as manufactured, at relatively low cost, which will permit of wide distribution and use, and thereby encourage the propagation of bird houses in many localities.

A further object of the invention is to provide in the bird house for the maintaining of sanitary conditions therein, not only due to adequate ventilation, but also by reason of the provision of adequate facilities for cleaning the bird house. This is provided by making the bottom of the bird house easily removable, permitting it to be cleaned out before nesting season and between broods. By removing the old nest after a young brood has moved out, this will encourage the adult birds to use the bird house more often.

The removability of the bottom of the bird house, according to this invention, not only lends itself to the simple and ready cleaning of the house, but it also facilitates the simple construction thereof, by reason of its utilization of the inclination of the side walls to support the side edges of the bottom for sliding movement of the latter. The bottom may also project forwardly sufficiently to form a perch or lighting place for the birds before they enter the bird house.

A preferred embodiment of the invention, together with a modification thereof, is shown in the accompanying drawing, in which.

Figure 1:
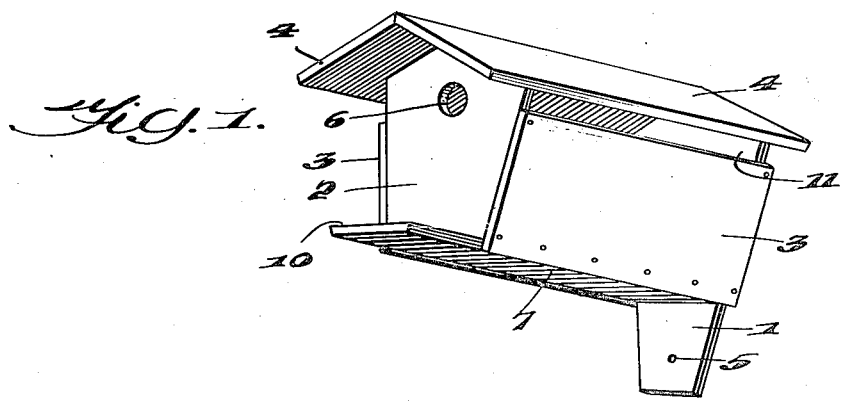
Fig. 1 is a perspective view of one form of bird house embodying this invention.
Figure 2:
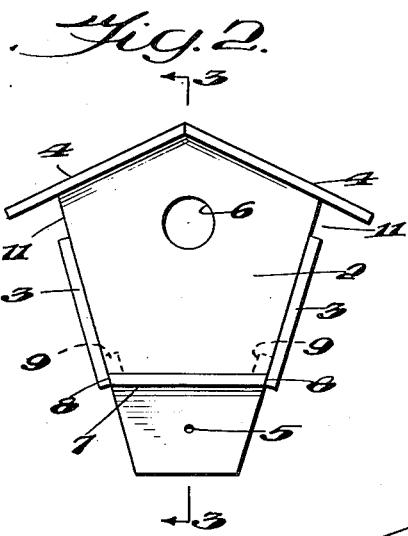
Fig. 2 is a front elevation thereof.
Figure 3:
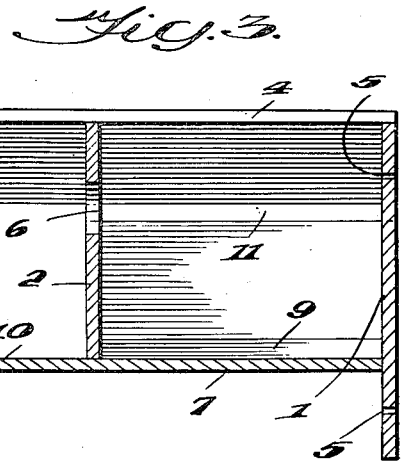
Fig. 3 is a longitudinal section therethrough on the line 3—3 of Fig. 2.
Figure 4:
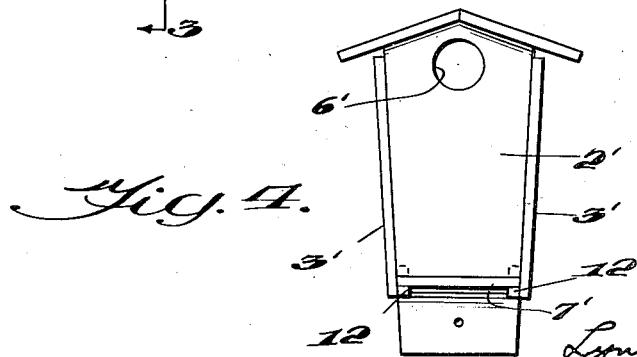
Fig. 4 is a front elevation of a modified form of bird house embodying this invention.

The form of the invention shown in Figs. 1 to 3 is particularly adapted to form a house for wrens and like small birds, but it will be obvious that the invention may be applied to other forms of houses for other species of birds, by varying the size or shape of the house, or the size of the entrance opening thereof. The form shown in Fig. 4 is adapted for use with bluebirds, chickadees, and titmice.

Referring to Figs. 1 to 3, the bird house here shown is constructed with a back wall 1 and a front wall 2, both of which are shown as having the opposite edges thereof converging toward the bottom or lower edges thereof. The back and front walls are joined together by means of side walls 3 and roof pieces 4, the latter being shown as of the conventional gable roof type. These side walls and roof pieces are preferably nailed in place on the back and front walls 1 and 2, so as to be securely fastened in rigid relationship thereon. The roof pieces 4 project over an appreciable distance beyond the front wall 2 to form an overhang or shade for the front of the bird house.

The back wall 1 is provided preferably with one or more holes 5 therein through which nails or other fastenings may extend for securing the house to a post or other support. The back wall 1 has a downwardly projecting lower end in which at least one of said holes is formed to facilitate the securing of the house to its support.

The front wall 2 has an opening 6 therein of a size and shape depending upon the species of bird to be accommodated therein and which forms an entrance opening into the house. It will be noted from Fig. 3 that the entrance opening is well protected by the projecting portion of the roof.

The bottom of the house is shown at 7 and is slidably mounted between the opposite lower edges of the side walls 3 which extend downward beneath the lower edge of the front wall 2 sufficiently to form guide-ways 8 for receiving and supporting the correspondingly tapered opposite edges of the bottom 7. The inclination of the side walls 3 and the slidable fit of the edges of the bottom 7 with these guide-ways is sufficient to form a slidable support to the bottom to enable it to be moved in and out and thereby open or close the lower portion of the bird house. Runner pieces 9 may be secured if desired to the inner face of the side walls 3 above the bottom 7, so as to prevent the latter from rising up too high from its supported position on the guide-ways 8 formed by the lower edges of the side walls 3. It will be noted also in Fig. 3, that the bottom 7 is of sufficient length to project forwardly a substantial distance beyond the front wall 2 forming a perch or support 10 for the bird before the latter enters the entrance opening 6. This projecting end portion of the bottom 7 serves also as a handle for sliding the bottom into and out of its closed position.

The sides 3 are shown as having the upper edges thereof spaced downwardly from the under sides of the top pieces 4 forming ventilating slots 11 along opposite sides thereof for the circulation of air through the house and the adequate ventilation thereof.

The construction of the house is such that the parts thereof may be sawed out to the proper size and shape for packing and transportation in knocked-down condition ready to be assembled at the point of use. This enables the house to be transported at relatively small cost and to be set up or assembled even by a child, with simple instructions, and the parts of the house nailed together to form a secure rigid construction.

When the bird house is assembled and ready for use, it may be secured to any suitable support according to the species of birds to be accommodated therein, and will afford protection for the eggs and young against molestation or attack by insects or other birds, providing for the breeding of the young in sanitary conditions. Thus the house may be constructed at small cost due to its simple construction, and also transported economically, and yet when set up, it forms a secure construction adapted for practical use for the nesting and brooding of birds. The mounting of the bottom 7 not only facilitates the simple and practical assembly of the house, but it also enables the house to be cleaned readily before the nesting season as well as between broods. This enables the old nests to be removed without difficulty to encourage the use of the house more frequently.

The form shown in Fig. 4 provides for greater depth of the house as may be desirable for bluebirds and other species, which require usually a larger size of house than for wrens, as well as a larger entrance opening 6' in the front wall 2'. The side walls 3' are tapered but at smaller acute inclination to the vertical, the bottom 7' being supported substantially in the manner described above in connection with Figs. 1 to 3 by the projecting lower edges of the side walls 3'. If insufficient support be provided for the bottom by the projecting edges of the side walls 3', due to the angular disposition thereof, additional support may be provided by securing lower runner pieces or guides 12 on the inner edges of the side walls 3' to serve as additional supports for the opposite edges of the bottom 7'. Otherwise, this house shown in Fig. 4 is constructed substantially like that shown in Figs. 1 to 3 and is adapted for similar use except for the difference in the species of birds to be accommodated thereby.

I claim:

1. A bird house comprising front and back walls, side walls connected therewith and a roof extending thereover, said front wall having an entrance opening therein, said side walls being arranged at an acute angle to each other and having the lower edge portions thereof projecting at an acute angle to each other beneath the lower edge of the front wall in alignment with the upper portions of said side walls and all points on the inner surface of each side wall lying in the same plane, and a bottom having opposite edges slidably fitting said lower edge portions of the side walls and supported and guided thereby for movement into and out of closed positions.

2. A bird house comprising front and back walls having downwardly converging opposite edges, a roof extending thereover, side walls extending between and secured to the front and back walls in converging relation on said opposite edges, said side walls having the lower edge portions thereof extending downwardly below the lower edge of the front wall in alignment with the upper portions of the converging side walls at the edges of the front and back and all points on the inner surface of each side wall lying in the same plane and forming guide-ways, and a bottom interposed between said lower edges of the side walls and having opposite edges supported on the guide-ways formed thereby.

3. A bird house comprising front and back walls having downwardly converging opposite edges, a roof extending thereover, side walls extending between and secured to the front and back walls in converging relation on said opposite edges, said side walls having the lower edge portions thereof extending downwardly below the lower edge of the front wall in alignment with the upper portions of the converging sides at the edges of the front and back and forming guide-ways, a bottom interposed between said lower edges of the side walls and having opposite edges supported on the guideways formed thereby, said bottom having the front end thereof projecting forwardly beyond the front wall forming a support or perch, and the side walls having the upper edges thereof spaced from the roof providing ventilating slots therebetween.

4. A bird house comprising front and back walls, side walls and roof pieces, all formed of wood, the front and back walls having opposite edges thereof converging toward the lower ends thereof at acute inclination to each other, the roof pieces being secured upon the front and back walls and extending thereover, the front wall having an entrance opening therein, the back wall having one or more openings therein for securing the house to a support, the side walls being secured upon the converging opposite edges of the front and back walls with the upper edges of said side walls spaced downwardly from the roof pieces substantially throughout the length of said upper edges and with the lower edges of said side walls extending downwardly below the lower edge of the front wall forming guide-ways therebeneath, said lower edges of the side walls beneath the bottom being arranged in converging relation in direct alignment with the upper portions of said side walls, and a bottom having beveled opposite edges slidably fitting with said guide-ways and supported by said lower edge portions of the side walls for movement into and out of closed positions, said bottom projecting forwardly beyond the front wall forming a perch for the support of the bird.

LYNN W. HOSKINS.